US006968777B2

(12) United States Patent
Lin

(10) Patent No.: US 6,968,777 B2

(45) Date of Patent: Nov. 29, 2005

(54) FOOD, VEGETABLES AND FRUIT PROCESSOR

(76) Inventor: Wei-Chih Lin, No. 27, Huairen St., Banchiao City, Taipei (TW)

( * ) Notice: Subject to any disclaimer, the term of this patent is extended or adjusted under 35 U.S.C. 154(b) by 0 days.

(21) Appl. No.: 10/785,979

(22) Filed: Feb. 26, 2004

(65) Prior Publication Data

US 2005/0188860 A1 Sep. 1, 2005

(51) Int. Cl.[7] .......................... A23N 1/00; A23N 1/02; A47J 43/046; A47J 43/07; A23L 1/00

(52) U.S. Cl. .......................................... 99/511; 99/513

(58) Field of Search .................. 99/492, 495, 509–513; 366/291, 297–300, 514, 601; 241/37.5, 92, 241/282.1, 282.2; 494/36, 37, 43, 47, 10, 494/85; 426/61, 63, 49, 52, 533, 599, 640, 426/231, 233

(56) References Cited

U.S. PATENT DOCUMENTS 2,634,776 A * 4/1953 Kowan et al. ................ 99/511
4,119,542 A * 10/1978 Yamaoka et al. ........ 210/360.2
5,207,152 A * 5/1993 Wettlaufer ................... 99/510
6,397,736 B1 * 6/2002 Tseng et al. .................. 99/511
6,609,455 B2 * 8/2003 Fouquet ....................... 99/511

* cited by examiner

*Primary Examiner*—Timothy F. Simone
(74) *Attorney, Agent, or Firm*—Dennison, Schultz, Dougherty & MacDonald

(57) ABSTRACT

A food, vegetables and fruit processor comprises a base having therein an operating motor, a lower cover, a cutting seat and an upper cover. Wherein the upper cover is provided with an inclined feed-in pipe extending downwardly therefrom, one end of the feed-in pipe forms on the surface of the upper cover a material inlet, the other end of the feed-in pipe forms a material outlet. Food, vegetables and fruit can be cast into the feed-in pipe, and are pressed tight with a material pushing plunger to render the food, vegetables and fruit to be perfectly and smoothly cut or ground in an energy saving mode. The present invention is applicable to using as a food, vegetables and fruit processor having the functions of squeezing juice and grinding food.

5 Claims, 9 Drawing Sheets

FOOD, VEGETABLES AND FRUIT PROCESSOR

BACKGROUND OF THE INVENTION

1. Field of the Invention

The present invention is related to a food, vegetables and fruit processor, and especially to a food, vegetables and fruit processor having an inclined feed-in pipe with which the food, vegetables and fruit can be cast into the feed-in pipe, and are pressed tight with a material pushing plunger to render the food, vegetables and fruit to be perfectly and smoothly cut or ground in an energy saving mode. The present invention is applicable to using as a food, vegetables and fruit processor having the functions of squeezing juice and grinding food.

2. Description of the Prior Art

Modern people live with a hurried pace, the ratios of eating outside get higher and higher; to maintain a good state of individual health, in addition to taking suitable sports and having necessary leisure times, the selections and arrangements of food and beverages with an attention to balance taking in of different nutrients are particularly important.

And in recent years, people pursue more eagerly healthfulness of eating, they hope to get beauty as well as health through taking nutrients of food, and therefore, organic food is popularized. The purpose of organic food is to take natural food as the material of people's food and beverages and the most often have are various juices of vegetables and fruit. Therefore, now there are various food processors used to processing vegetables, fruit and bean food to have food minced and juices squeezed from the food, vegetables and fruit to allow people to fast acquire nutrients supplement.

Presently, the devices of vegetables and fruit processors in the market seen each generally is provided on the surface of the machine with a vertical material inlet, food cast into the material inlet can be cut or ground into juice by means of a high-speed rotating cutting and grinding disk in the machine. However, such a structural device has the following flaws although it has the function of high-speed cutting and grinding:

1. With the design of the cutting knife of the conventional cutting and grinding disk, a dead corner of cutting exists at the center of the disk, so that the material inlet must be disposed vertically at a position deviating from the center of the cutting and grinding disk. If the food, vegetables or fruit to be cut is overly large, it must be cut into pieces before placing into the material inlet, this is very troublesome.
2. Further, because the material inlet is disposed at a position deviating from the center of the cutting and grinding disk, the size of its diameter is limited, so that the area for cutting and grinding food is reduced, the time as well as the electric quantity for cutting and grinding food is relatively increased.

SUMMARY OF THE INVENTION

The primary object of the present invention is to provide a food, vegetables and fruit processor having an inclined feed-in pipe with which the food, vegetables and fruit of larger volume cast into the feed-in pipe can be perfectly and smoothly cut without having a problem of a dead corner of cutting.

To achieve the above stated object of the present invention, the food, vegetables and fruit processor of the present invention comprises a base having therein an operating motor, a lower cover, a cutting seat and an upper cover.

The lower cover is mounted on the upper end of the base and has a receiving space to receiving the cutting seat. The upper cover is mounted on the upper end of the lower cover. The base is provided on the upper end thereof with a connecting portion rotatable synchronically with the operating motor, the connecting portion is connected thereabove with the cutting seat. The upper cover is provided with an inclined feed-in pipe extending downwardly therefrom, one end of the feed-in pipe forms on the surface of the upper cover a material inlet, the other end of the feed-in pipe forms a material outlet. When the upper cover is covered, the material outlet of the feed-in pipe is confronted with the upper side of the cutting seat.

Thereby, when the food, vegetables and fruit of larger volume are cast into the feed-in pipe, by pressing tight with a material pushing plunger, the food, vegetables and fruit can be perfectly and smoothly cut without having a problem of a dead corner of cutting.

The present invention will be apparent after reading the detailed description of the preferred embodiment thereof in reference to the accompanying drawings.

DETAILED DESCRIPTION OF THE PREFERRED EMBODIMENT

Figure 1:
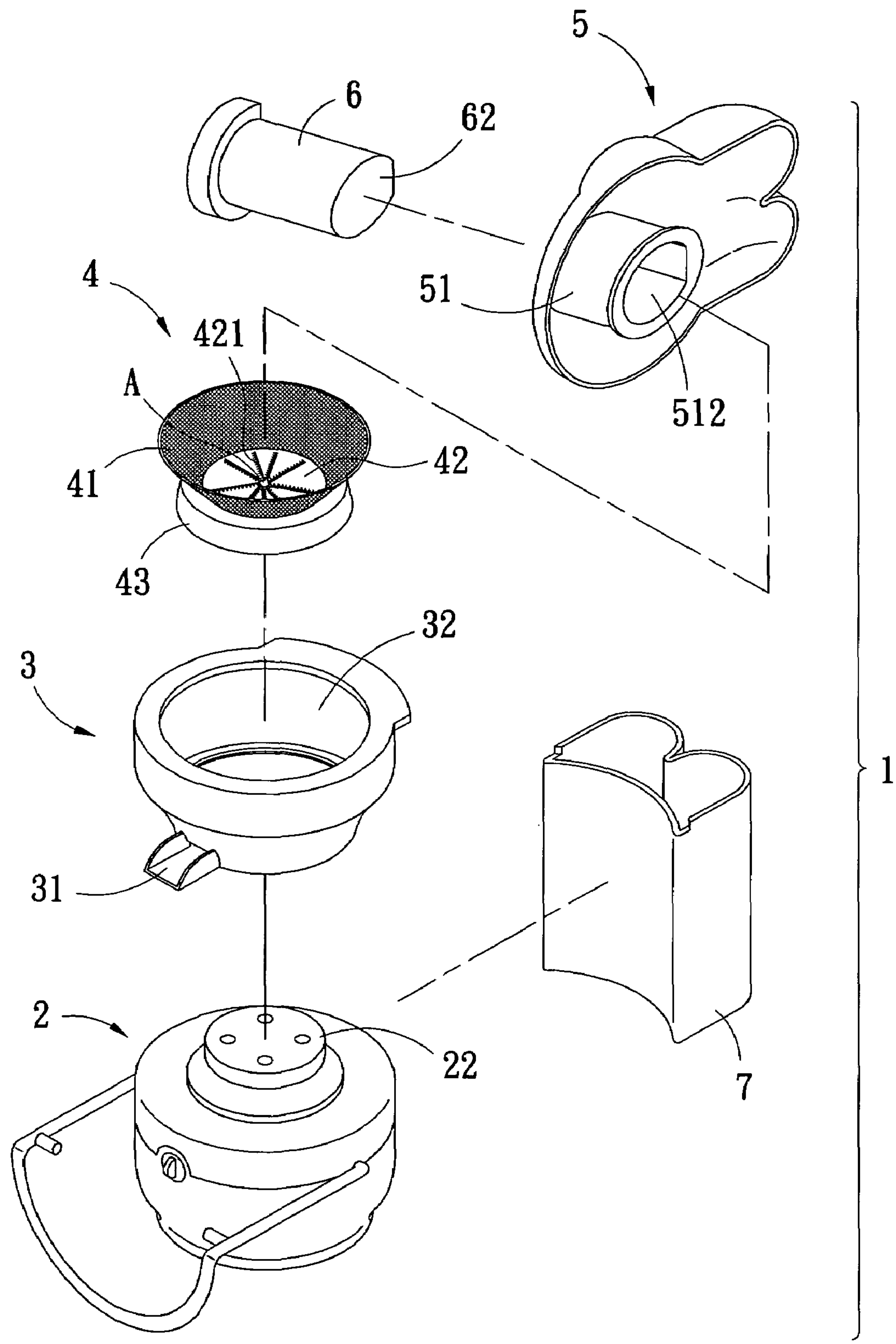
FIG. 1 is an exploded perspective view of an embodiment of the present invention.
Figure 2:
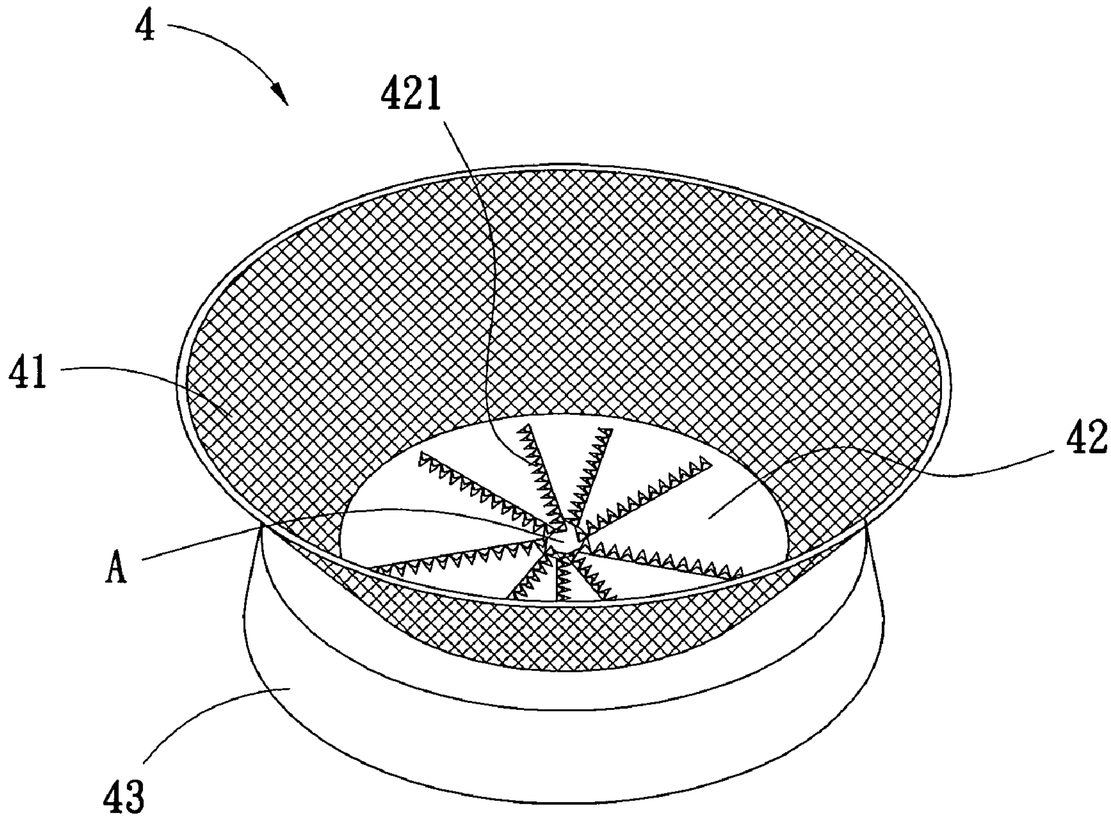
FIG. 2 is a perspective view showing the appearance of a cutting and grinding seat of the embodiment of the present invention.
Figure 3:
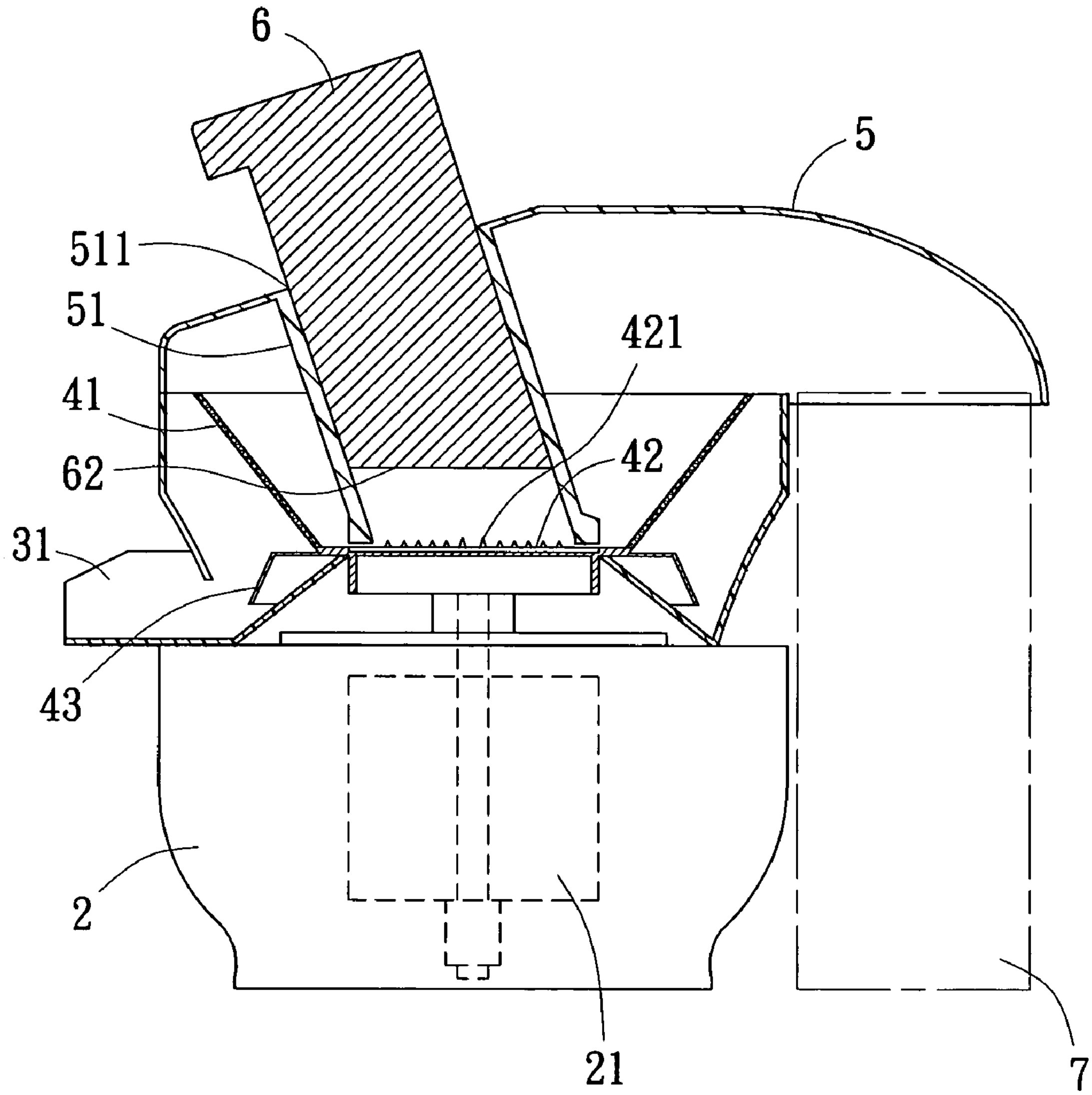
FIG. 3 is an exploded view showing the cutting and grinding seat and a base of the embodiment of the present invention.

Referring firstly to FIGS. 1–3 depicting a preferred embodiment of a food, vegetables and fruit processor 1 of the present invention, the present invention comprises: a base 2, a lower cover 3, a cutting seat 4, an upper cover 5, a material pushing plunger 6 and a dregs receiving box 7.

The base 2 is in the shape of a cylinder slightly contracted at the bottom thereof, it is provided therein with an operating motor 21 (as shown in FIG. 2). The operating motor 21 is provided on the upper end thereof with a connecting portion 22 rotatable synchronically with the operating motor 21. The connecting portion 22 protrudes out of the upper end of the base 2.

The lower cover 3 is mounted on the base 2, it is provided on the bottom end thereof with a juice outlet 31 and has therein a receiving space 32.

The cutting seat 4 includes a filtering net 41, a knife disk 42 and a disk lid 43 for preventing downward leakage of the cut/ground liquid. The cutting seat 4 is received in the receiving space 32 of the lower cover 3. The knife disk 42 is provided on the upper end of the cutting seat 4 and is surrounded with the filtering net 41. The knife disk 42 is provided on the inner side of the upper surface thereof with a plurality of mutually spaced away toothed knifes 421 arranged along a round surface, the teeth of the toothed knifes 421 near the center "A" of the knife disk 42 are higher than those teeth of the toothed knifes 421 near the periphery of the knife disk 42.

The upper cover 5 is mounted on the lower cover 3, it is provided with an inclined feed-in pipe 51 extending downwardly therefrom to allow the material pushing plunger 6 to move up and down in the feed-in pipe 51. An end of the material pushing plunger 6 has a bevel surface 62 parallel to the upper surface of the cutting seat 4; the cross-sections of the material pushing plunger 6 and the feed-in pipe 51 are both in a corresponding shape of a horseshoe or a polygon (not shown). The upper cover 5 forms on the surface thereof a material inlet 511; the other end of the feed-in pipe 51 forms a material outlet 512.

Figure 4:
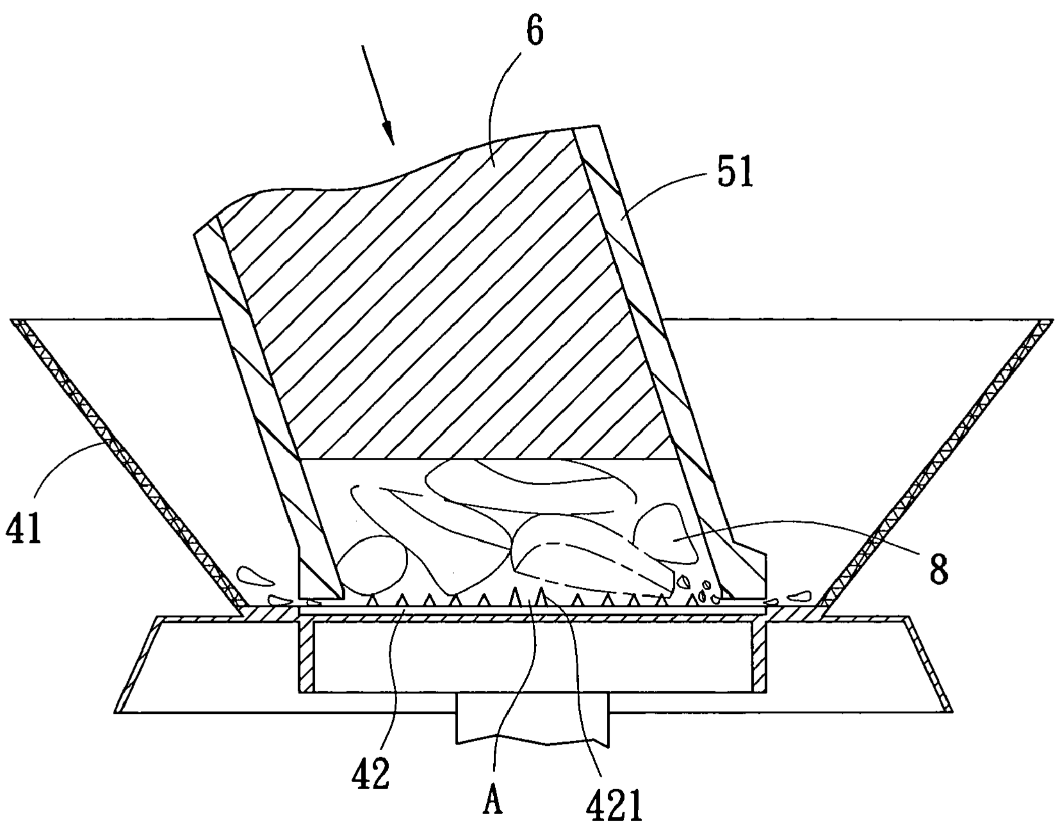
FIG. 4 is a schematic sectional view showing the process of cutting and grinding of the embodiment of the present invention.

Thereby as shown in FIG. 4, the base 2, the lower cover 3 and the upper cover 5 form an integral body after assembling. When the upper cover 5 is covered onto the lower cover 3, the material outlet 512 of the feed-in pipe 51 is confronted with the upper side of the cutting seat 4; thereby a larger volume of the food, vegetables and fruit cast into the material inlet 511 of the upper cover 5 can be cut and ground by the cutting seat 4 at the material outlet 512.

Figure 5:
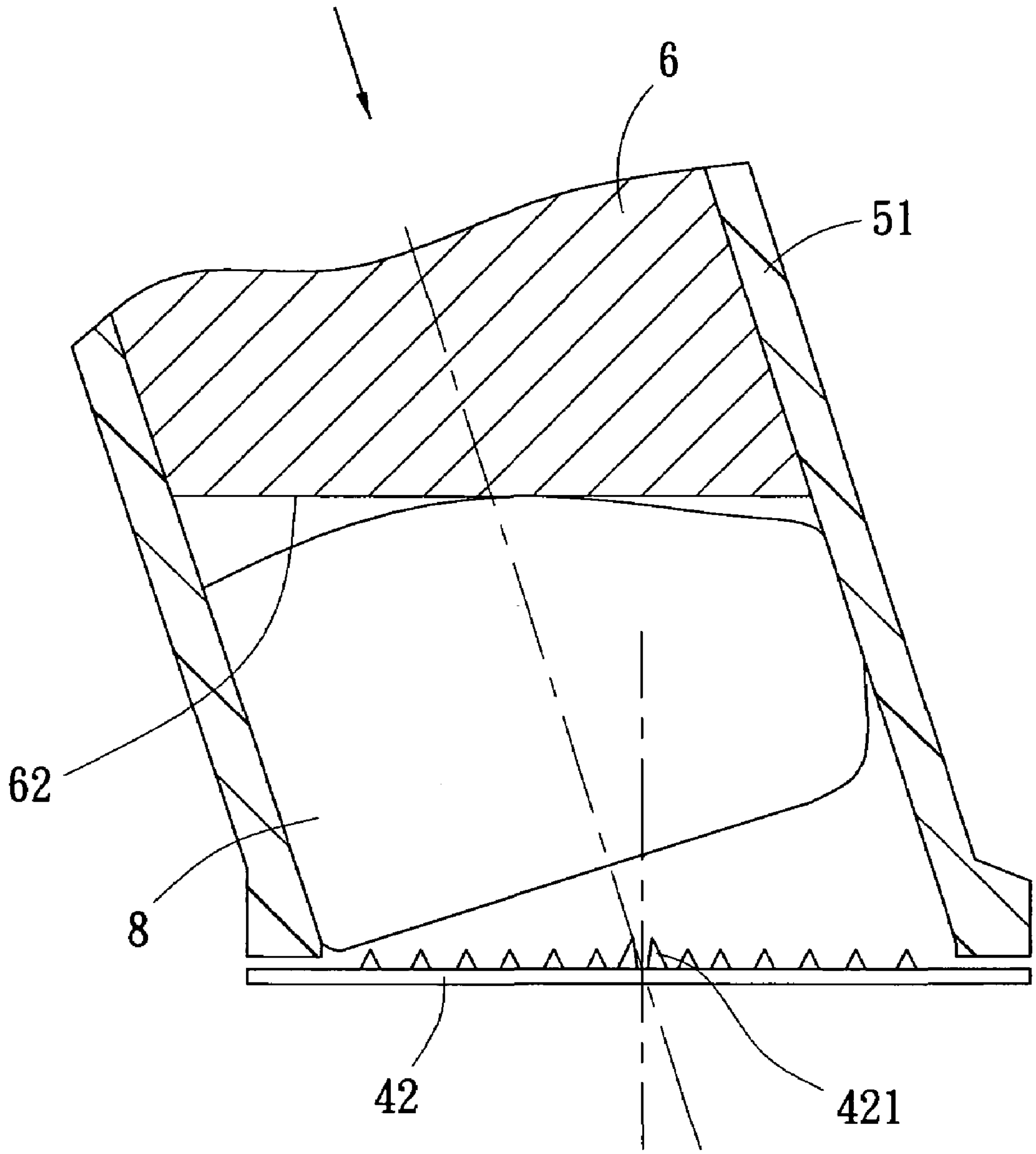
FIG. 5 is a schematic sectional view showing a large volume of a kind of food, vegetables or fruit being cast into the embodiment of the present invention.
Figure 6:
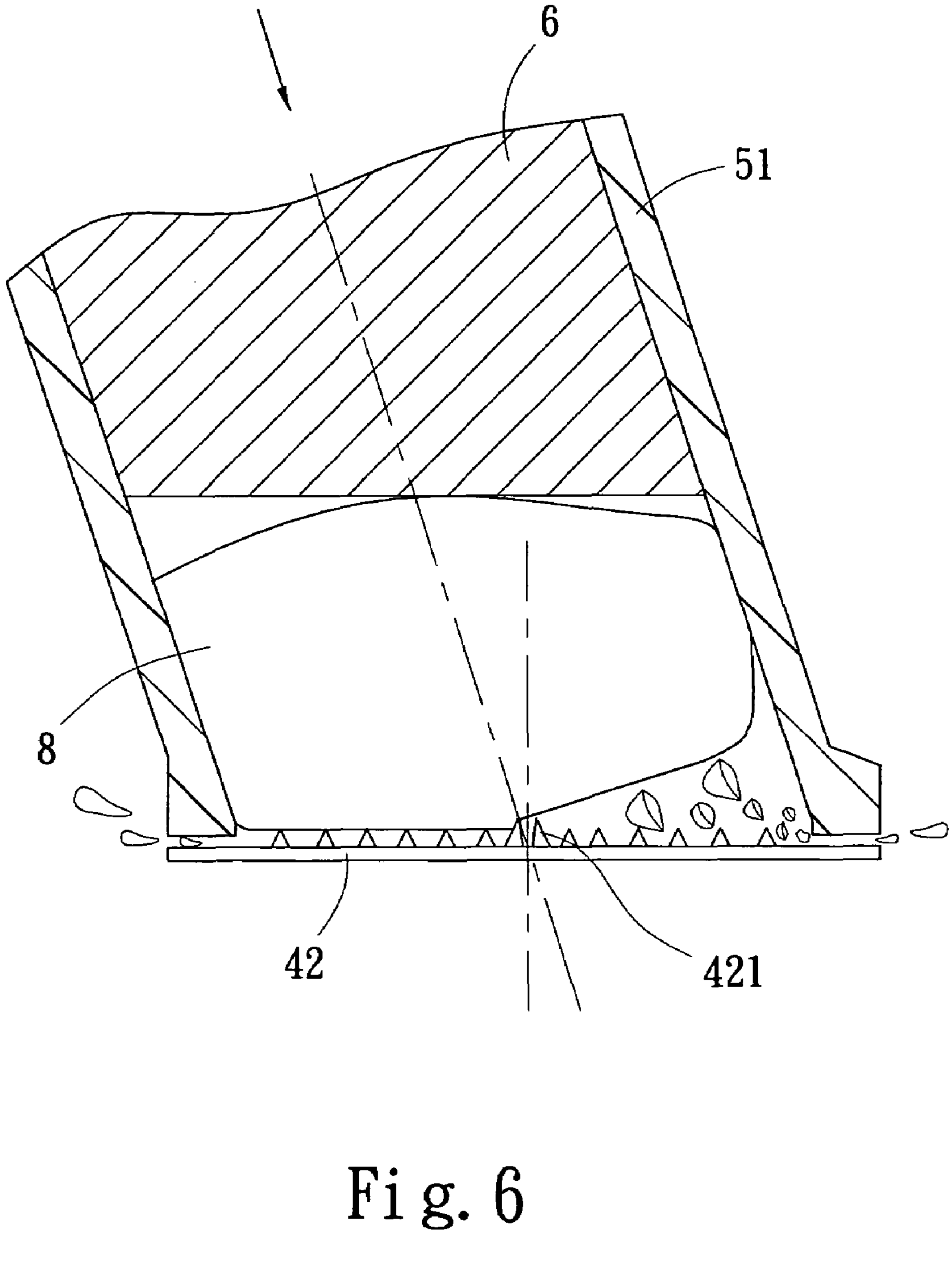
FIG. 6 is a schematic sectional view showing a large volume of a kind of food, vegetables or fruit being cutting and grinding with the embodiment of the present invention.
Figure 7:
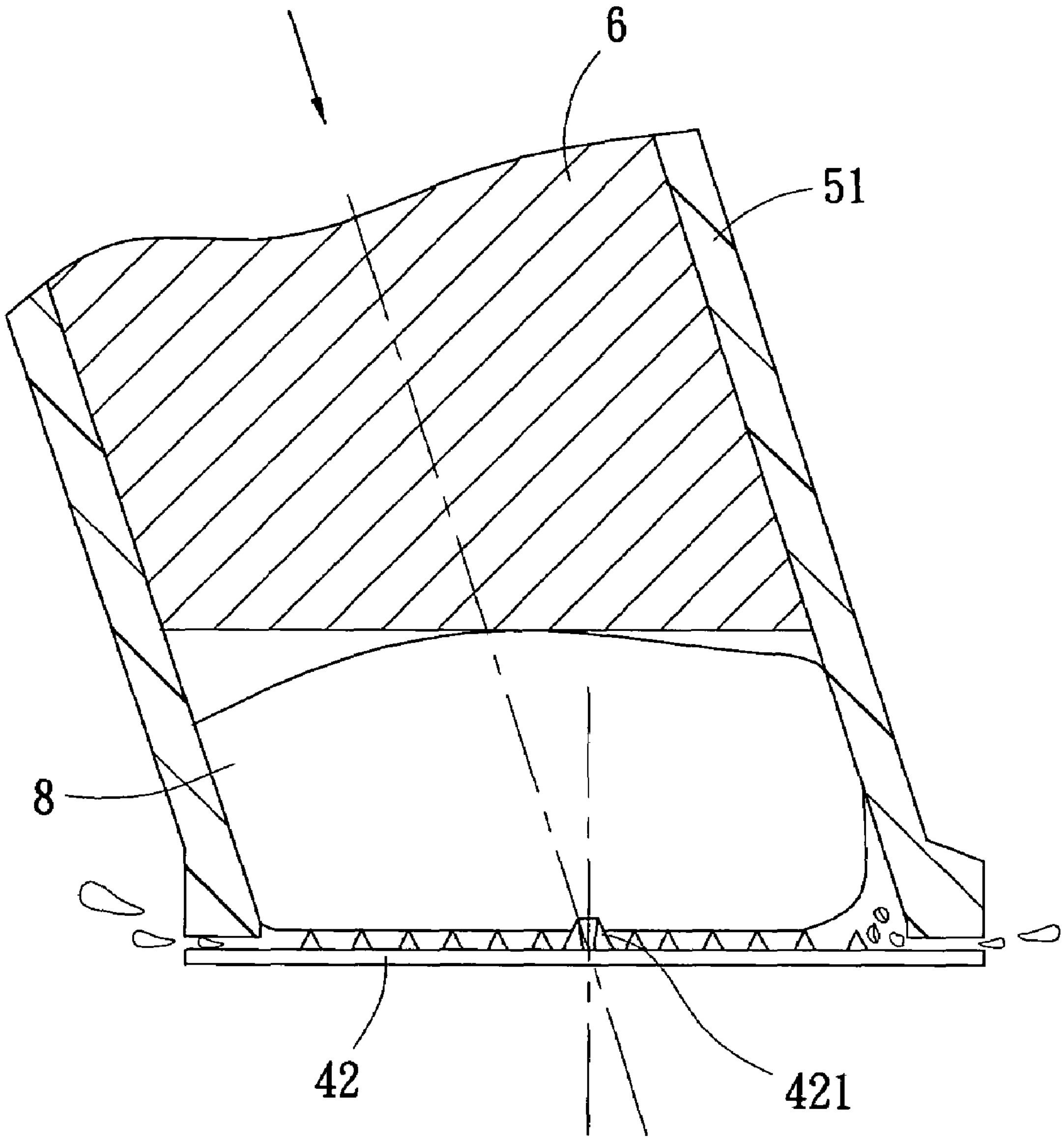
FIG. 7 is another schematic sectional view showing a large volume of a kind of food, vegetables or fruit being cutting and grinding with the embodiment of the present invention.
Figure 8:
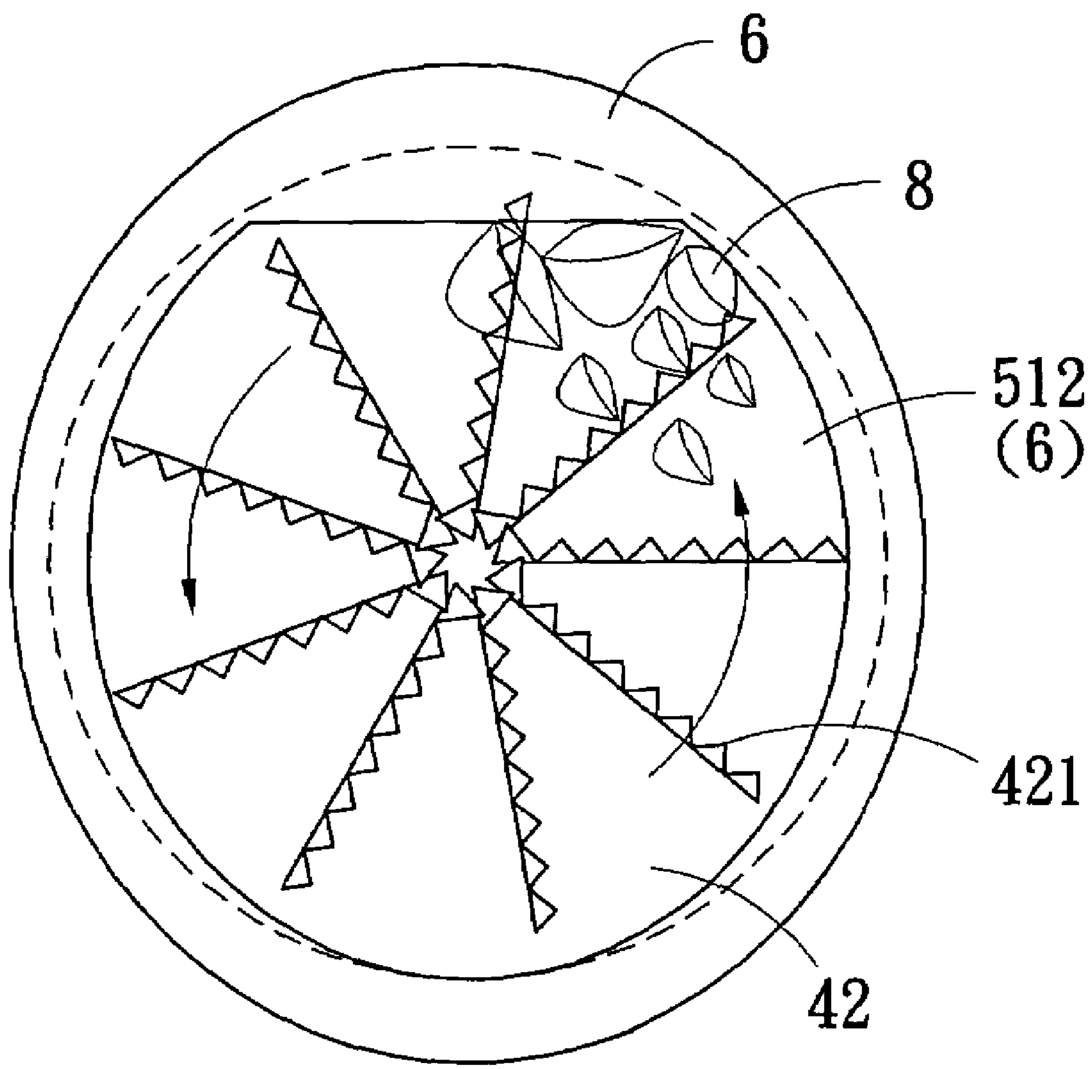
FIG. 8 is a schematic plane view showing use of a knife disk of the present invention to cut by rotation.

And referring to FIGS. 4–8, with the design of the inclined feed-in pipe 51, the material inlet 511 is formed on the surface of the upper cover 5, the material outlet 512 is confronted with the upper side of the cutting seat 4, so that the larger volume of the food, vegetables and fruit can be cast in. When casting the larger volume of food, vegetables and fruit 8 and pushing the material pushing plunger 6 forwards (such as are shown in FIGS. 5–7), and before the central part of the larger volume of the food, vegetables and fruit 8 is pushed to the axis of the knife disk 42, the food, vegetables and fruit 8 is cut and broken by the toothed knifes 421 near the center "A" of the knife disk 42. Even when there is no toothed knife 421 near the center "A" of the knife disk 42 (as shown in FIG. 2), there will be no problem of having a dead corner at the central point. Moreover, generally food, vegetables and fruit 8 for cutting and the inclined feed-in pipe 51 have therebetween gaps, the food, vegetables and fruit 8 can even be perfectly cut by deviation of the central point of the food, vegetables and fruit 8 by forwarding pushing force of the material pushing plunger 6. When it is to cut a smaller volume of food, vegetables and fruit 8 (as shown in FIG. 4), the food, vegetables and fruit 8 is subjected to the forwarding pushing force of the material pushing plunger 6, and to the influence of a centrifugal force generated by rotation of the knife disk 42 in cutting, the food, vegetables and fruit 8 can be fast pressed and cut and ground, thereby the down pushing force can be reduced.

Figure 9:
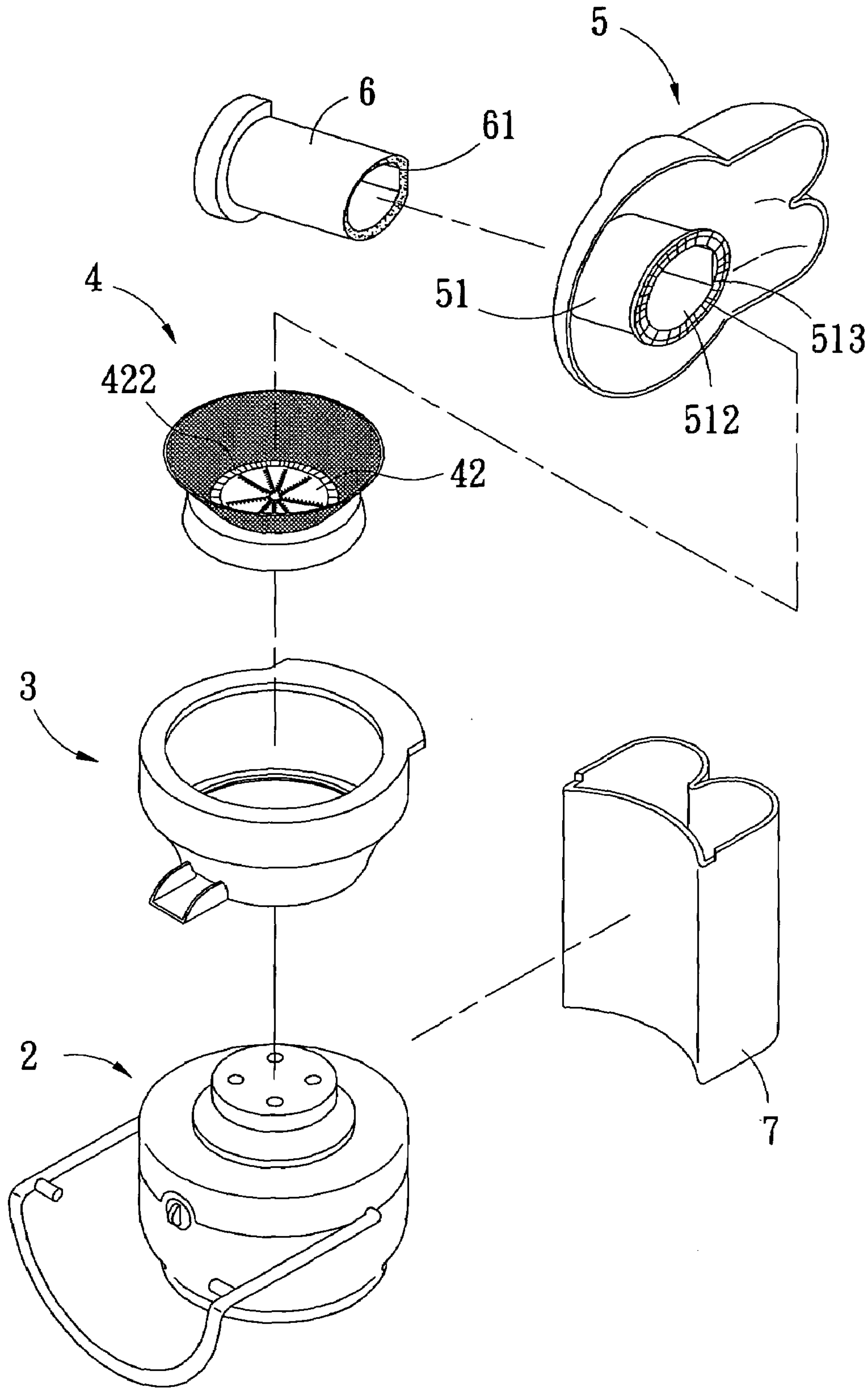
FIG. 9 is an exploded perspective view of another embodiment of the present invention.

And referring to FIG. 9, in addition to the above stated cutting function, the present invention can also have a grinding function; as to this function, an implement layer 61 is provided on the end of the material pushing plunger 6, the knife disk 42 is provided on the periphery thereof with a grinding layer 422, the above stated material outlet 512 of the feed-in pipe 51 is also provided on the periphery thereof with a corresponding grinding layer 513, thereby the food, vegetables and fruit 8 cut by the knife disk 42 can be ground.

The present invention thereby has the following advantages:

1. The feed-in pipe of the present invention is provided in the machine in an inclined mode, thereby the diameter of the pipe is designed much larger than that of a conventional pipe, it can thereby allow casting in a larger volume of food, vegetables and fruits, it is very convenient for use. The feed-in pipe disposed in the inclined mode renders the central area of the knife disk unnecessary to provide toothed knifes, so that the food, vegetables and fruit of a larger volume can be cut without having a problem of a dead corner of cutting.
2. The food, vegetables and fruit in the present invention is cast in an inclined mode, an end of the material pushing plunger has a bevel surface parallel to the upper surface of the cutting seat, so that when it is to cut food, vegetables and fruit of a smaller volume, the food, vegetables and fruit is subjected to the downward pushing force of the material pushing plunger and to the influence of a centrifugal force generated in cutting, and because of the high speed rotation of the knife disk, the food, vegetables and fruit can be fast pressed and cut.
3. The cross-sections of the material pushing plunger and the feed-in pipe are both in a corresponding shape of a horseshoe or a polygon; this is convenient for a user to place them in position in use, and further renders the cut food, vegetables and fruit to be limited in moving by such design of shapes in the cross-sections during cutting because of high-speed rotation of the knife disk.

In conclusion, the present invention can achieve the expected object thereof to provide to a food, vegetables and fruit processor, with which food, vegetables and fruit can be perfectly and smoothly cut without having a problem of a dead corner of cutting. Having thus described my invention that is extremely practically valuable, what I claim as new and desire to be secured by Letters Patent of the United States are:

What is claimed is:

1. A food, vegetables and fruit processor comprising:

a base provided therein with an operating motor, a lower cover, a cutting seat and an upper cover; wherein said lower cover is mounted on said base and having a receiving space to receive said cutting seat, said upper cover covers said lower cover, said base is provided on an upper end thereof with a connecting portion rotatable synchronically with said operating motor, said connecting portion is connected thereabove with said cutting seat; said processor is characterized in that:

said upper cover is provided with an inclined feed-in pipe extending downwardly therefrom, one end of said feed-in pipe forms on a surface of said upper cover a material inlet, the other end of said feed-in pipe forms a material outlet; when said upper cover is covered, said material outlet of said feed-in pipe is confronted with substantially entire surface above an upper side of said cutting seat; food, vegetables and fruit are cast into said material inlet from said surface of said upper cover, and are pressed tight with a material pushing plunger to render said food, vegetables and fruit to be cut at said material outlet, and wherein said material pushing plunger has on an end thereof a bevel surface parallel to an upper surface of said cutting seat.

2. The food, vegetables and fruit processor as in claim 1, wherein cross-sections of said material pushing plunger and said feed-in pipe are both in a corresponding shape of a horseshoe.

3. The food, vegetables and fruit processor as in claim 1, wherein cross-sections of said material pusher plunger and said feeding pipe are both in a corresponding shape of a polygon.

4. A food, vegetables and fruit processor comprising:

a base provided therein with an operating motor, a lower cover, a cutting seat and an upper cover; wherein said lower cover is mounted on said base and having a receiving space to receive said cutting seat, said upper cover covers said lower cover, said base is provided on an upper end thereof with a connecting portion rotatable synchronically with said operating motor, said connecting portion is connected thereabove with said cutting seat; said processor is characterized in that:

said upper cover is provided with an inclined feed-in pipe extending downwardly therefrom, one end of said feed-in pipe forms on a surface of said upper cover a material inlet, the other end of said feed-in pipe forms a material outlet; when said upper cover is covered, said material outlet of said feed-in pipe is confronted with substantially entire surface above an upper side of said cutting seat; food, vegetables and fruit are cast into said material inlet from said surface of said upper cover, and are pressed tight with a material pushing plunger to render said food, vegetables and fruit to be cut at said material outlet, wherein said cutting seat includes a knife disk to cut food, vegetables and fruit, said knife disk is provided thereon with a plurality of mutually spaced away toothed knives arranged along a round surface, and wherein an implement layer is provided on said end of said material pushing plunger, said knife disk is provided on the preiphery thereof with a grinding layer, said material outlet of said feed-in pipe is also provided on the periphery thereof with a corresponding grinding layer, thereby food, vegetables and fruit cut by said knife disk are ground.

5. The food, vegetables and fruit processor as in claim 4, wherein teeth of said toothed knives near the center of said knife disk are higher than those teeth of said toothed knives near the periphery of said knife disk.

* * * * *

US006968777C1

(12) INTER PARTES REEXAMINATION CERTIFICATE (474th)

United States Patent

(10) Number: US 6,968,777 C1

(45) Certificate Issued: Oct. 15, 2012

Lin

(54) FOOD, VEGETABLES AND FRUIT PROCESSOR

(76) Inventor: Wei-Chih Lin, Banchiao (TW)

Reexamination Request:
No. 95/001,839, Feb. 3, 2012

Reexamination Certificate for:

| | |
|---|---|
| Patent No.: | **6,968,777** |
| Issued: | **Nov. 29, 2005** |
| Appl. No.: | **10/785,979** |
| Filed: | **Feb. 26, 2004** |

(51) Int. Cl.

| | |
|---|---|
| *A23N 1/00* | (2006.01) |
| *A23N 1/02* | (2006.01) |
| *A47J 43/046* | (2006.01) |
| *A47J 34/07* | (2006.01) |
| *A23L 1/00* | (2006.01) |

(52) U.S. Cl. ........................................... 99/511; 99/513

(58) Field of Classification Search ........................ None
See application file for complete search history.

(56) References Cited

To view the complete listing of prior art documents cited during the proceeding for Reexamination Control Number 95/001,839, please refer to the USPTO's public Patent Application Information Retrieval (PAIR) system under the Display References tab.

*Primary Examiner* — Terrence Till

(57) ABSTRACT

A food, vegetables and fruit processor comprises a base having therein an operating motor, a lower cover, a cutting seat and an upper cover. Wherein the upper cover is provided with an inclined feed-in pipe extending downwardly therefrom, one end of the feed-in pipe forms on the surface of the upper cover a material inlet, the other end of the feed-in pipe forms a material outlet. Food, vegetables and fruit can be cast into the feed-in pipe, and are pressed tight with a material pushing plunger to render the food, vegetables and fruit to be perfectly and smoothly cut or ground in an energy saving mode. The present invention is applicable to using as a food, vegetables and fruit processor having the functions of squeezing juice and grinding food.

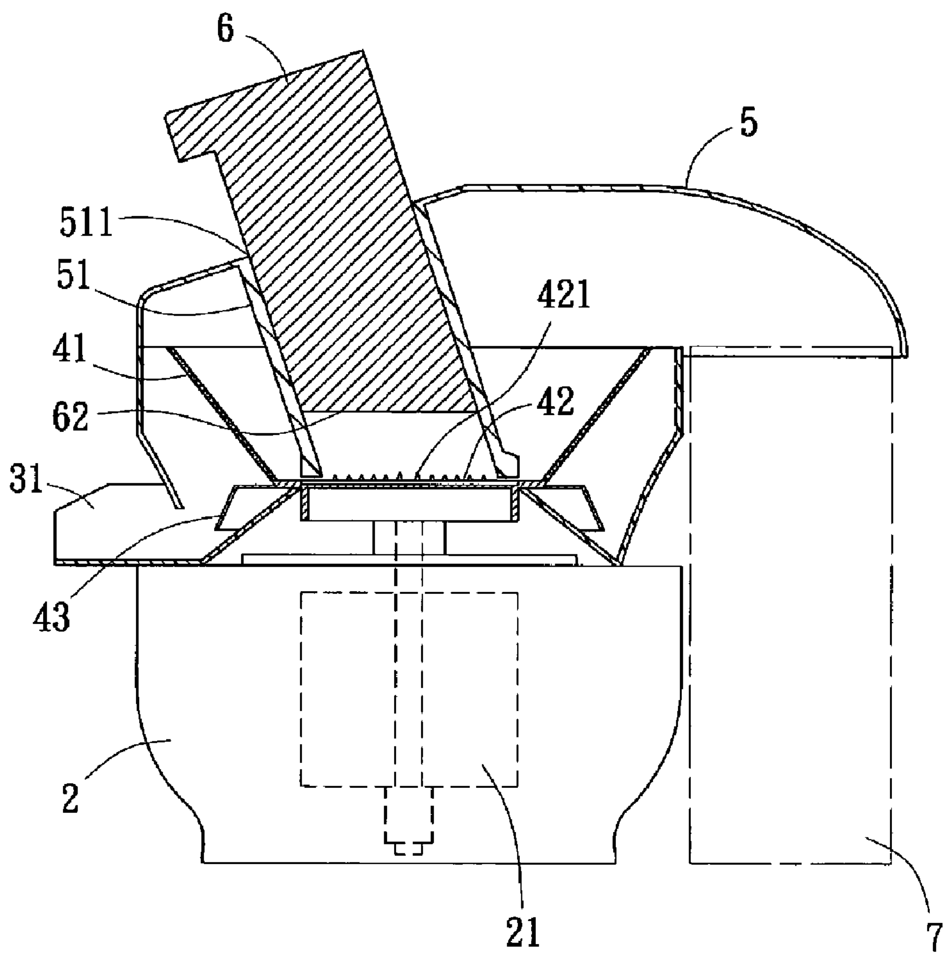

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-4 are cancelled.

Claim 5 was not reexamined.

* * * * *